United States Patent
Post, II

(10) Patent No.: US 7,634,342 B2
(45) Date of Patent: Dec. 15, 2009

(54) METHOD FOR DEPLOYING A TORQUE REDUCTION AND TORQUE LIMITATION COMMAND THROUGH PER WHEEL TORQUE CONTROL OF A CONTROLLABLE 4-WHEEL-DRIVE SYSTEM

(75) Inventor: James W. Post, II, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 11/328,910

(22) Filed: Jan. 10, 2006

(65) Prior Publication Data

US 2006/0212173 A1    Sep. 21, 2006

Related U.S. Application Data

(60) Provisional application No. 60/663,385, filed on Mar. 18, 2005.

(51) Int. Cl.
*B60K 28/16* (2006.01)
*B60T 7/12* (2006.01)
*G06F 17/00* (2006.01)
*G06F 19/00* (2006.01)

(52) U.S. Cl. ............... 701/48; 701/69; 701/71; 701/76; 701/89; 180/197

(58) Field of Classification Search .......... 701/1, 701/29, 36, 48, 51, 65, 67–71, 69–76, 82, 701/78–84, 87–90, 92, 31, 33, 34, 38, 39, 701/53, 58; 180/197, 233, 244, 245, 248, 180/271, 282
See application file for complete search history.

(56) References Cited

U.S. PATENT DOCUMENTS

| | | | |
|---|---|---|---|
| 5,482,133 A * | 1/1996 | Iwata et al. ............ | 180/197 |
| 5,701,247 A * | 12/1997 | Sasaki .................. | 701/1 |
| 6,059,065 A * | 5/2000 | Takeda et al. ........... | 180/244 |
| 6,208,929 B1 * | 3/2001 | Matsuno et al. .......... | 701/89 |
| 6,254,204 B1 | 7/2001 | Hara et al. | |
| 6,397,282 B1 | 5/2002 | Hashimoto et al. | |
| 6,564,134 B2 | 5/2003 | Nishida et al. | |
| 6,587,775 B2 | 7/2003 | Nishida et al. | |
| 6,634,451 B2 | 10/2003 | Sakakiyama | |
| 6,842,681 B2 | 1/2005 | Imai et al. | |
| 6,850,830 B2 | 2/2005 | Nishida et al. | |

(Continued)

FOREIGN PATENT DOCUMENTS

DE      102 41 455 A1      3/2004

(Continued)

*Primary Examiner*—Edward Pipala
(74) *Attorney, Agent, or Firm*—Rankin, Hill & Clark LLP; Mark E. Duell

(57) ABSTRACT

A method for deploying torque commands from a vehicle stability assist control system to a four wheel drive system in a vehicle that includes utilizing a firewall within a four wheel drive system electronic control unit to analyze commands sent from a vehicle stability assist electronic control unit to the four wheel drive electronic control unit. Additionally, the commands from the vehicle stability assist electronic control unit, when the vehicle control system is in operation, are integrated with commands independently generated by the four wheel drive electronic control unit, and resultant wheel torque commands are generated to be provided to each individual wheel in the four wheel drive system.

11 Claims, 5 Drawing Sheets

U.S. PATENT DOCUMENTS

| | | | |
|---|---|---|---|
| 6,862,511 B1 | 3/2005 | Phillips et al. | |
| 6,907,337 B2 * | 6/2005 | Phillips et al. | 701/51 |
| 6,909,959 B2 * | 6/2005 | Hallowell | 701/88 |
| 6,923,514 B1 * | 8/2005 | Spieker et al. | 303/199 |
| 2002/0002436 A1 * | 1/2002 | Nishida et al. | 701/72 |
| 2003/0065432 A1 * | 4/2003 | Shuman et al. | 701/48 |
| 2004/0049332 A1 | 3/2004 | Doh | |
| 2004/0249545 A1 * | 12/2004 | Lu et al. | 701/70 |
| 2005/0060076 A1 * | 3/2005 | Phillips et al. | 701/51 |
| 2005/0274560 A1 * | 12/2005 | Wakao et al. | 180/197 |

FOREIGN PATENT DOCUMENTS

| | | |
|---|---|---|
| DE | 102 44 519 A1 | 4/2004 |
| EP | 1 493 608 A2 | 1/2005 |
| JP | 11-115719 | 4/1999 |
| JP | 2002-307985 | 10/2002 |
| JP | 2003-231428 | 8/2003 |

* cited by examiner

METHOD FOR DEPLOYING A TORQUE REDUCTION AND TORQUE LIMITATION COMMAND THROUGH PER WHEEL TORQUE CONTROL OF A CONTROLLABLE 4-WHEEL-DRIVE SYSTEM

This application claims priority to U.S. Provisional Application No. 60/663,385, filed on Mar. 18, 2005, the entirety of which is incorporated herein.

BACKGROUND OF THE INVENTION

1. Field of the Invention

The present invention is directed toward a method of receiving torque reduction or torque limitation requests in a vehicle control system.

2. Description of Related Art

Synergistic operation of multiple vehicle control systems is preferred and a method to provide such operation is provided through a cooperative control system. In a typical cooperative control system design, a top level electronic control unit (ECU) having a top level algorithm evaluates and controls the overall strategy for vehicle dynamics such as traction control, stability control, body motion control, etc. The top level ECU then controls ECUs within individual vehicle control systems to meet the goals of the overall strategy.

The cooperative control system may include a vehicle stability assist (hereinafter VSA) individual control system. The VSA system is controlled by an ECU subordinate to the top level ECU. The VSA system works by controlling brake pressure, engine torque, and/or individual wheel torque to help maintain traction between the vehicle wheels and a road surface. Specifically, detrimental effects caused by oversteer and understeer can be combated through adjustment of the torques and brake pressure. The VSA system ECU, in turn, sends commands and requests to other systems, for example, the vehicle's four-wheel-drive (4WD) system. An ECU dedicated to the 4WD system receives and implements the commands and requests sent by the VSA ECU.

However, because the 4WD system is strongly manipulated by feed-forward control whereas the VSA system is not, requests sent from the VSA system to the 4WD system are often contradictory to requests provided directly by the 4WD system. As a result, in combination, the VSA and 4WD systems may not perform efficiently. Additionally, erroneous requests supplied by the VSA system can be implemented by the 4WD system without being checked.

SUMMARY OF THE INVENTION

The present invention provides an improvement over the prior art by providing a method that provides a better rounded performance envelope between the VSA system and 4WD system. Additionally, requests sent from the VSA system to the 4WD system must pass additional scrutiny before being implemented. The present invention is directed toward a method of deploying torque reduction and torque limitation commands from a VSA ECU to a vehicle 4WD system that avoids any conditions that could become unsafe.

According to the present invention, a method for deploying torque commands from a vehicle stability assist control system to a four wheel drive system in a vehicle is provided that includes the step of utilizing a firewall within a four wheel drive system electronic control unit to analyze commands sent from a vehicle stability assist electronic control unit to the four wheel drive electronic control unit. Additionally, the method includes the step of integrating the commands from the vehicle stability assist electronic control unit, when the vehicle control system is in operation, with commands independently generated by the four wheel drive electronic control unit, and generating resultant wheel torque commands to be provided to each individual wheel in the four wheel drive system.

The commands sent from the vehicle stability assist control system may be requests to reduce vehicle torque or limit vehicle torque. These and other aspects of the invention are herein described in particularized detail with reference to the accompanying figures.

DETAILED DESCRIPTION OF THE PREFERRED EMBODIMENTS

This invention provides a deployment firewall that screens request signals sent by a vehicle VSA ECU and prevents any signal that would place the vehicle into an unstable condition from being implemented by a vehicle 4WD ECU without modification.

Figure 1:
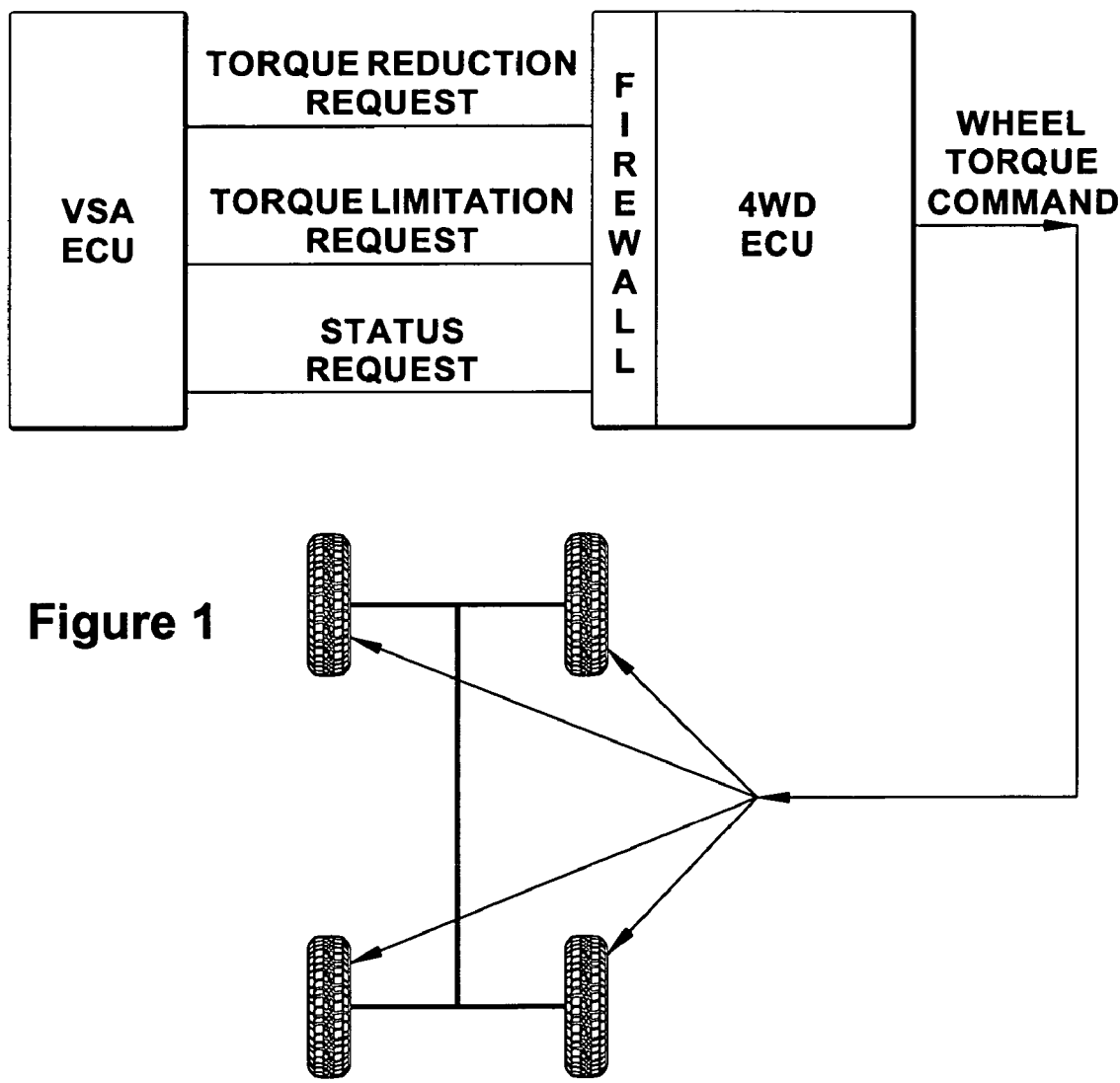
FIG. 1 is a schematic representation of request deployment within the present invention.

With reference to FIG. 1, a system for deploying torque reduction and torque limitation commands is illustrated. The VSA ECU and 4WD ECU are installed on a vehicle having four wheel drive and means for adjusting the torque at each wheel. Request signals are sent from the VSA ECU to the 4WD ECU, the request signals include torque reduction requests, torque limitation requests and status requests. Before the 4WD ECU can act on the requests sent by the VSA ECU the request must pass through a virtual firewall.

After the torque requests from the VSA ECU have been modified, if necessary, the requests are integrated with torque requests from the 4WD ECU that were generated independent from the VSA ECU. The resultant torque requests are then implemented as instructions to vary the torque at individual wheels.

"Minimum Torque Value" and "Maximum Allowable Control Release Rate": The system continuously calculates a "minimum allowable torque" value and a "maximum allowable control release rate". The values for minimum allowable torque and maximum allowable control release rate vary depending upon the drive torque requested by the 4WD ECU alone and the vehicle speed. Specifically, the minimum allowable torque is calculated based on the status of the 4WD system, vehicle dynamics, etc.

"Control Permission Speeds": Control permission speeds are used as thresholds for implementing two Speed Range Coefficients (see below) that prevent high speed mis-operation of the cooperative control system. Control permission speed is the sum of wheel speed signals received from each of the four vehicle wheels minus the sum of maximum and minimum values of the same wheel speed signals. The sum is divided by two.

$$\frac{\sum \text{Speeds (wheel 1-4)} - (\text{Max. wheel speed} + \text{Min. wheel speed})}{2}$$

This calculation reduces the influence of a single wheel speed sensor failure on the calculated control permission speed.

"Speed Range Coefficients": For the purposes of low speed traction and stability, and to avoid high-speed mis-operation of the cooperative VSA and 4WD systems, a speed range coefficient is calculated to scale both incoming torque limitation and reduction requests from the VSA ECU.

The VSA torque reduction request is scaled down within certain ranges of calculated control permission speed by multiplying the VSA torque reduction request value by a weighting factor having a value between 1.0 and zero. The weighting factor is 1.0 from a control permission speed of zero to a lower threshold vehicle permission speed. Between the lower threshold permission speed and an upper threshold permission speed, the weighting factor moves linearly from 1.0 to zero. Above the upper threshold permission speed the weighting factor is zero, causing the VSA torque reduction request to be zero as well.

The VSA torque limitation request is also scaled down within certain ranges of calculated control permission speed. The VSA torque limitation request value is multiplied by a weighting factor having a value between 1.0 and zero. Similar to the weighting factor used with the VSA torque reduction request, the torque limitation scaling factor is 1.0 from a vehicle control permission speed of zero to a lower threshold control permission speed. The lower threshold control permission speed may be the same speed or a different speed as compared to the speed where the torque reduction weighting factor begins decreasing. Between the lower threshold permission speed and an upper threshold permission speed, the weighting factor moves linearly to zero. Above the upper threshold permission speed the weighting factor is zero. The upper threshold vehicle permission speed may be the same speed or a different speed as compared to the speed where the torque reduction weighting factor reaches zero.

"Torque Release Rate": The system includes a torque release rate that limits how fast the resultant torque can change when, during vehicle operation, the VSA system fails or is turned off. In this situation an existing torque request from the VSA system is instantaneously removed. The change from the VSA requested torque level to the level without any VSA request often can not be instantaneous, however, for safety reasons. Thus, a maximum torque release rate dictates how fast the level change occurs.

Figure 2:
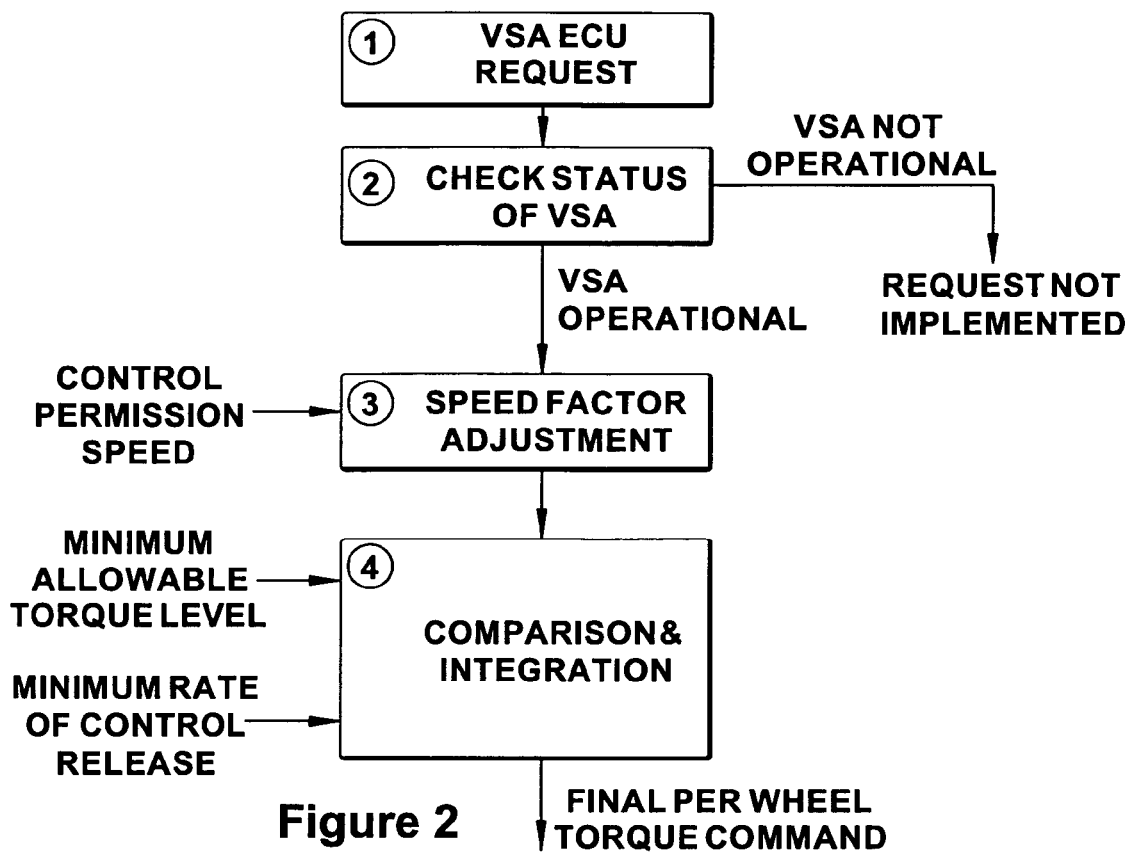
FIG. 2 is a flowchart showing method steps of the present invention.

Referring to FIG. 2, general operation of a firewall in a system deploying a torque reduction or torque limitation request is shown. In a first step, the reduction or limitation request is sent by the VSA ECU. In a second step, the operational status of the VSA system is confirmed. Only if the VSA system is in an operational state will the request be implemented. In a third step, the request is scaled based on the speed coefficients and control permission speed, as described above. In a fourth step, the request is compared to a maximum torque release rate level, if present, for the reasons described above, and integrated with the 4WD wheel torque requests to provide a resultant individual wheel torque command.

Figure 3:
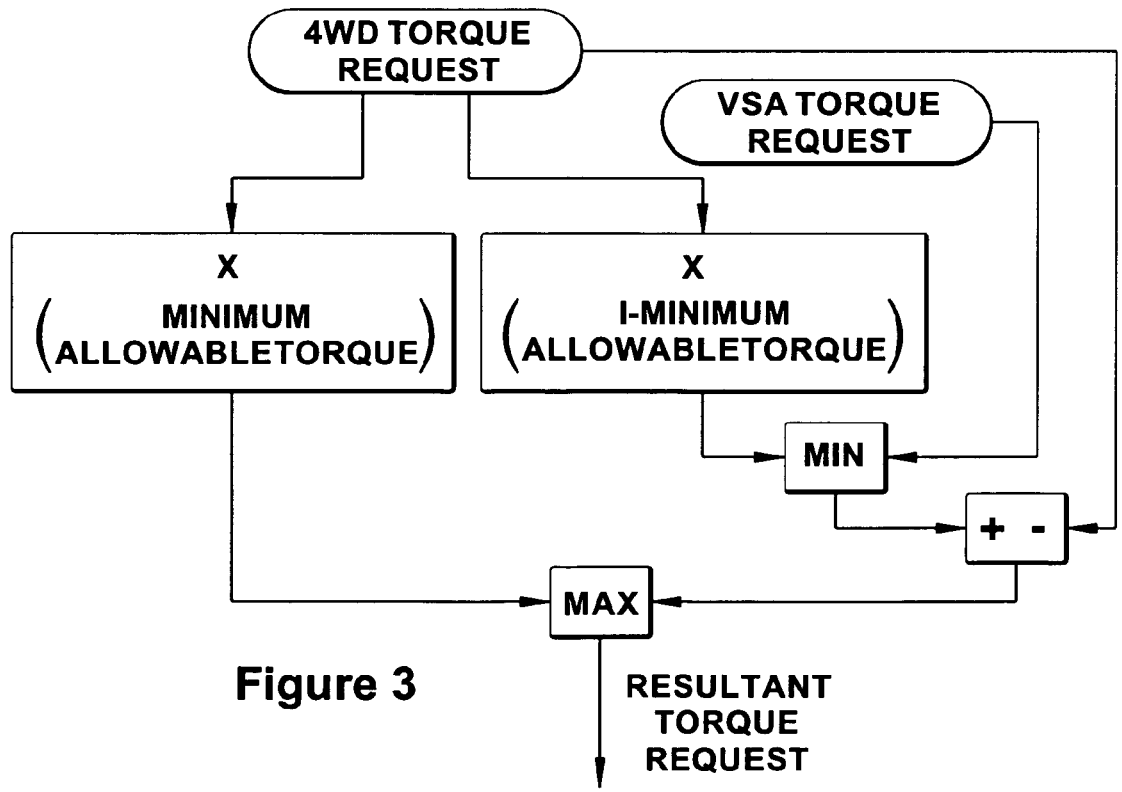
FIG. 3 is a flowchart showing integration within the present invention.

Referring to FIG. 3, the process of integration is illustrated for embodiments where a torque reduction request is sent by the VSA ECU. The 4WD torque request is multiplied by 1 minus the minimum allowable torque percentage and compared to the VSA torque request. The minimum value of this comparison is subtracted from the 4WD torque request and compared to the 4WD torque request multiplied times the minimum allowable torque percentage. The maximum value of this comparison is the resultant torque request. A similar integration method is used for both torque limitation requests and reduction requests.

FIGS. 4-8 illustrate the system of the present invention comparison and integration steps in different embodiments, for example the VSA ECU requests torque limitation or torque reduction, the system embodiment optionally including a minimum allowable torque and/or torque release rate. It will be appreciated that within FIGS. 4-8 lines/curves representing equivalent values are shown directly adjacent to one another and not in an overlapping fashion.

Figure 4:
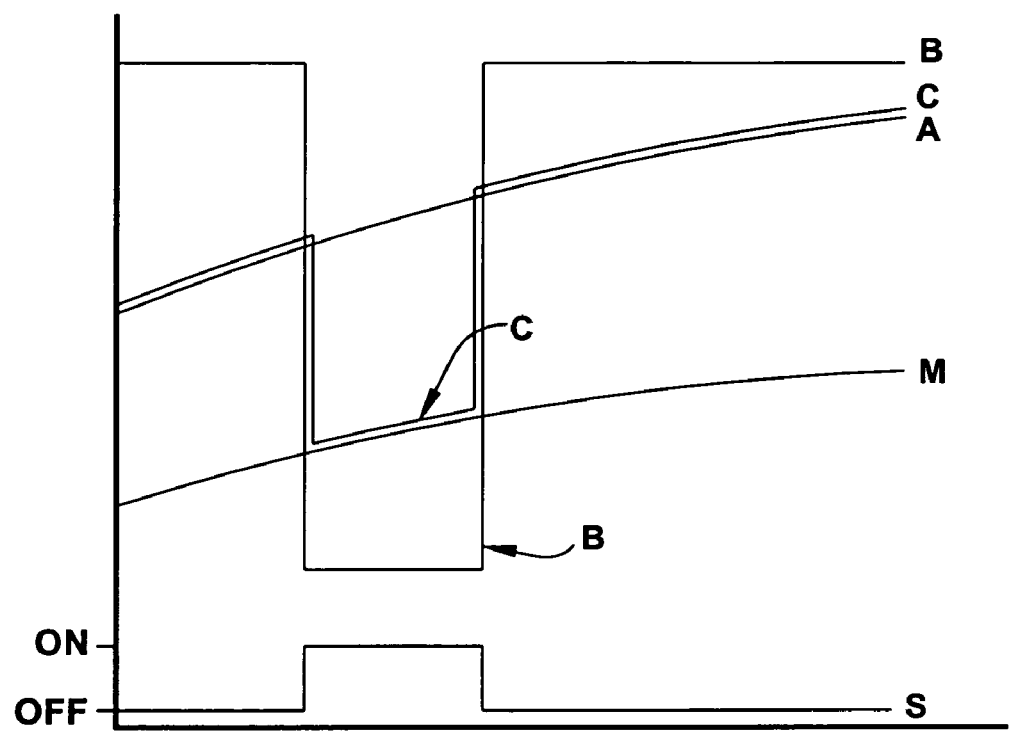
FIGS. 4-8 are schematic representations of system embodiments of the present invention.

Referring to FIG. 4, a system embodiment is shown wherein the VSA ECU requests torque limitation, the system also including a minimum allowable torque value. Curve A illustrates the individual wheel torque requested by the 4WD ECU alone. Line B illustrates the individual wheel torque requested by the VSA ECU alone. Line S shows the operational status (On/Off) of the VSA system. The VSA monitors operating parameters of the vehicle and, in response to these parameters, is activated to request torque limitation for individual wheels so as to selectively modify the torque of each wheel. Note when the VSA is operational, a request to limit torque is generated, thus, the torque requested by the VSA system (line B) drops from a constant higher value (no limiting) to a lower value (limiting requested). Curve M illustrates the minimum allowable torque imposed by the 4WD. Before the VSA is turned on the resultant torque request shown as line "C" is the torque requested by the 4WD ECU alone. In the illustrated embodiment, because the minimum allowable torque is a value greater than the torque requested by the VSA ECU, when the VSA ECU is operational, the resultant torque request "C", is equivalent to the minimum allowable torque. When the VSA is turned off, the resultant torque request "C" returns to a value equivalent to the request made by the 4WD ECU alone.

Figure 5:
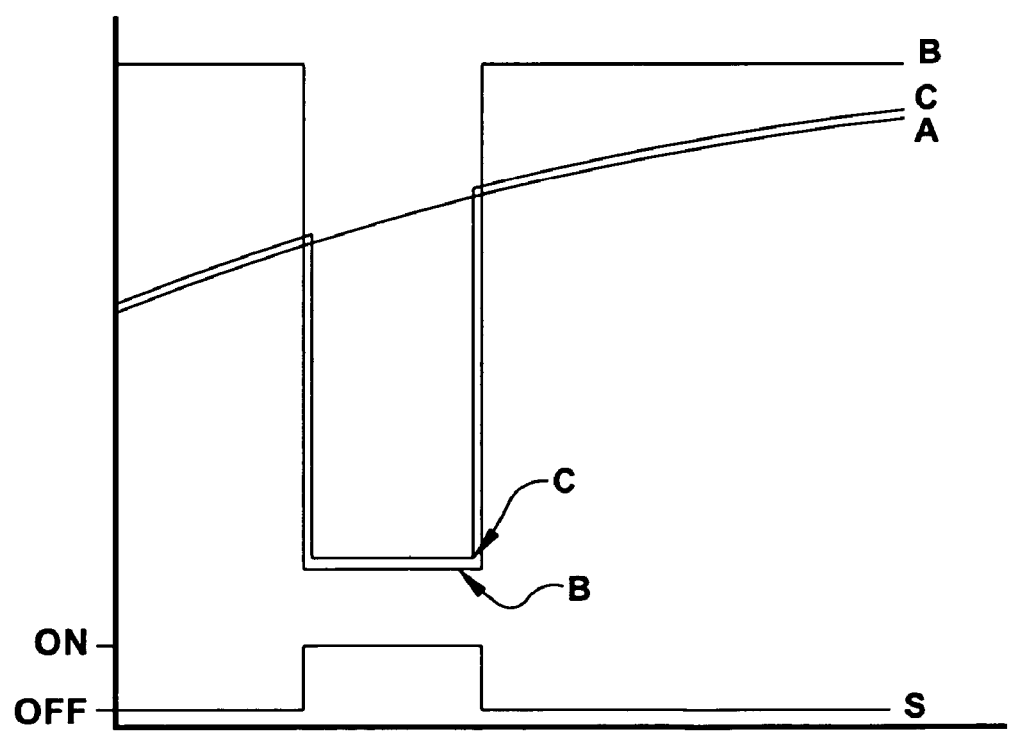

Referring to FIG. 5, a similar embodiment is shown wherein the VSA system requests torque limitation; however, the embodiment does not include a minimum allowable torque. Thus, when the VSA is active the resultant torque request "C" is equivalent to the torque requested by the VSA ECU, "B".

Figure 6:
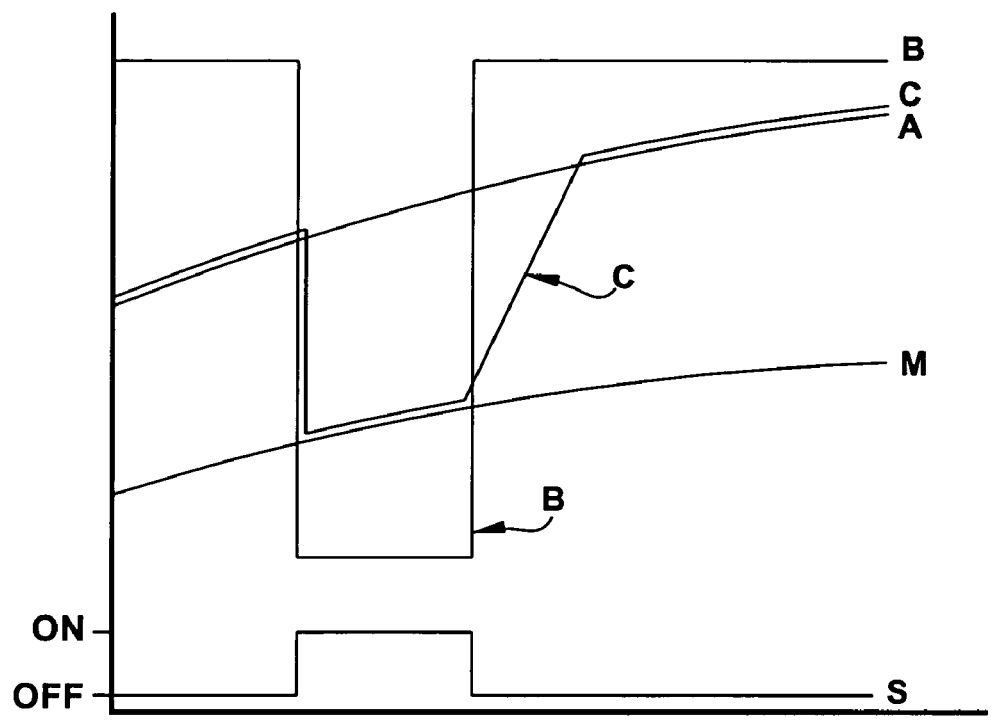

Referring to FIG. 6, a system embodiment is shown that includes a minimum allowable torque value and a maximum rate of control release. The control release rate is the amount of resultant torque request change from when the VSA system is operating to when the VSA is not operating divided by the time in which this torque request change is implemented. The embodiments of FIGS. 4 and 5 illustrate systems where there was no limit on the control release rate, thus, when the VSA system became non-operational, the torque requested changed instantaneously from the minimum allowable torque (FIG. 4) or VSA requested torque (FIG. 5) to the 4WD requested torque. In the system illustrated in FIG. 6, the change is not instantaneous, but rather is defined by the slope of line "C", specifically the maximum slope of line "C" immediately after the VSA system is turned off. Thus, prior to the VSA being turned on, the resultant torque "C" is equivalent to the torque requested by the 4WD ECU. When the VSA is turned on, the resultant torque "C" is equivalent to the minimum allowable torque "M". When the VSA is turned off the resultant torque "C" proceeds back to the torque requested by the 4WD ECU at the rate of control release.

Figure 7:
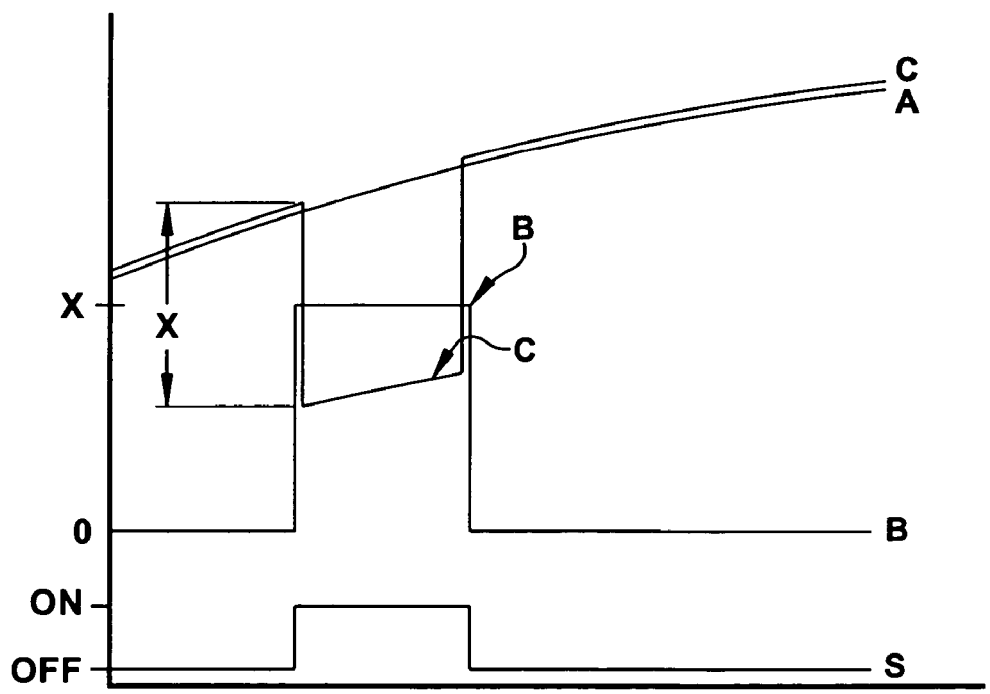

Referring to FIG. 7, a system embodiment is shown wherein the VSA ECU requests torque reduction as opposed to limitation. Curve A illustrates the individual wheel torque requested by the 4WD ECU alone. Line B illustrates the individual wheel torque reduction amount requested by the VSA ECU. Line S shows the operational status (On/Off) of the VSA system. Note when the VSA is operational, a request to reduce torque is generated, thus, the reduction rises from zero to X. The resultant torque request, shown as line "C", is equivalent the individual wheel torque requested by the 4WD ECU alone minus the reduction amount, X.

Figure 8:
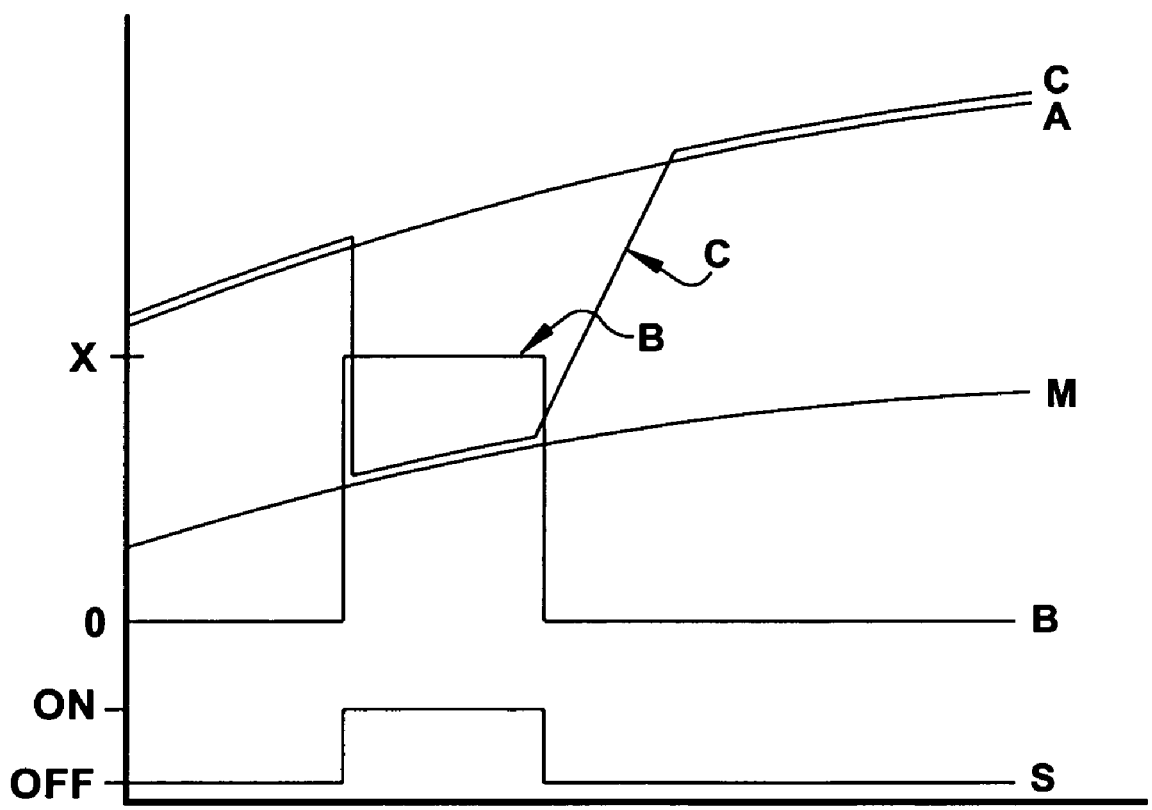

Referring to FIG. 8, a system embodiment is shown wherein the VSA system again requests torque reduction, the system also including a minimum allowable torque value. Curve A illustrates the individual wheel torque requested by the 4WD ECU alone. Line B illustrates the individual wheel torque reduction amount requested by the VSA ECU alone. Curve M illustrates the minimum allowable torque. Because the minimum allowable torque is a value greater than the resultant torque caused by the reduction requested by the VSA ECU, when the VSA ECU is operational, the resultant torque request, shown as line "C", is equivalent to the minimum allowable torque. The system embodiment also includes a minimum rate of control release. The control release rate is the amount of torque request change from when the VSA system is operating to when the VSA is not operating divided by the time in which this torque change is implemented.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method for deploying torque commands from a vehicle stability assist (VSA) control system to a four wheel drive system in a vehicle comprising the steps of:
    utilizing a firewall within a four wheel drive system electronic control unit to analyze torque commands sent from a vehicle stability assist electronic control unit to the four wheel drive electronic control unit;
    integrating within the four wheel drive system electronic control unit the torque commands from the vehicle stability assist electronic control unit, when the vehicle control system is in operation, with torque commands independently generated by the four wheel drive electronic control unit;
    generating resultant wheel torque commands to be provided to each individual wheel in the four wheel drive system;
    wherein the commands sent from the vehicle stability assist control system are requests to limit wheel torques; and
    further including the step of calculating a maximum torque release rate and when the operational status of the VSA changes from operational to non-operational, maintaining the rate of resultant torque change below the maximum torque release rate.

2. The method of claim 1, wherein analysis performed by the firewall includes confirming that the vehicle control system is operating.

3. The method of claim 1, further including the step of scaling the torque commands from the vehicle stability assist electronic control unit based on the speed of the vehicle.

4. The method of claim 3, wherein the speed of the vehicle is a control permission speed calculated by the steps of:
    adding the values of wheel speed signals received from each of the vehicle's four wheels to provide a first speed sum;
    adding the values of the maximum and minimum speed signals of said four wheel speed signals to provide a second speed sum; and
    subtracting the second speed sum from the first speed sum and dividing the difference by two.

5. The method of claim 3, wherein the commands sent from the vehicle stability assist control system are multiplied by a scaling factor having a value between 1.0 and zero depending on the vehicle speed, whereby
    when the vehicle speed is between zero and a lower threshold speed, the scaling factor is 1.0;
    when the vehicle speed is between the lower threshold speed and an upper threshold speed the scaling factor varies linearly with respect to vehicle speed from 1.0 to zero;
    when the vehicle speed is above the upper threshold speed, the scaling factor is zero.

6. The method of claim 1, wherein when the vehicle stability assist control system is operational the resultant wheel torque command is the vehicle stability assist command.

7. The method of claim 1, further including the step of calculating a minimum torque value and wherein when the vehicle stability assist control system is operational the resultant wheel torque command is the greater of the vehicle stability assist command and the minimum torque value.

8. A method for deploying torque commands from a vehicle stability assist (VSA) control system to a four wheel drive system in a vehicle comprising the steps of:
    utilizing a firewall within a four wheel drive system electronic control unit to analyze torque commands sent from a vehicle stability assist electronic control unit to the four wheel drive electronic control unit;
    integrating within the four wheel drive system electronic control unit the torque commands from the vehicle stability assist electronic control unit, when the vehicle control system is in operation, with torque commands independently generated by the four wheel drive electronic control unit;
    generating resultant wheel torque commands to be provided to each individual wheel in the four wheel drive system;
    wherein the commands sent from the vehicle stability assist control system are requests to reduce wheel torques; and further including the step of calculating a maximum torque release rate and when the operational status of the VSA changes from operational to non-operational, maintaining the rate of resultant torque change below the maximum torque release rate.

9. The method of claim 8, wherein when the vehicle stability assist control system is operational the resultant wheel torque command is torque value of the command independently generated by the four wheel drive electronic control unit minus the torque value of vehicle stability assist command.

10. The method of claim 8, further including the step of calculating a minimum torque value and wherein when the vehicle stability assist control system is operational the resultant wheel torque command is the greater torque value of the command independently generated by the four wheel drive electronic control unit minus the torque value of vehicle stability assist command and the minimum torque value.

11. The method of claim 8, further including the step of scaling the torque commands from the vehicle stability assist electronic control unit based on the speed of the vehicle, and wherein the commands sent from the vehicle stability assist control system are requests to reduce wheel torques and are multiplied by a scaling factor having a value between 1.0 and zero depending on the vehicle speed, whereby when the vehicle speed is between zero and a lower threshold speed, the scaling factor is 1.0;

when the vehicle speed is between the lower threshold speed and an upper threshold speed the scaling factor varies linearly with respect to vehicle speed from 1.0 to zero;

when the vehicle speed is above the upper threshold speed, the scaling factor is zero.

\* \* \* \* \*